（12） United States Patent
Kumar et al.

(10) Patent No.: US 11,474,203 B2
(45) Date of Patent: Oct. 18, 2022

(54) METHOD AND SYSTEM FOR DETERMINING CORRECTNESS OF LIDAR SENSOR DATA USED FOR LOCALIZING AUTONOMOUS VEHICLE

(71) Applicant: Wipro Limited, Bangalore (IN)

(72) Inventors: R. Balaji Sunil Kumar, Bengaluru (IN); Manas Sarkar, Barasat (IN)

(73) Assignee: Wipro Limited, Bangalore (IN)

( * ) Notice: Subject to any disclaimer, the term of this patent is extended or adjusted under 35 U.S.C. 154(b) by 498 days.

(21) Appl. No.: 16/695,381

(22) Filed: Nov. 26, 2019

(65) Prior Publication Data

US 2021/0096220 A1 Apr. 1, 2021

(30) Foreign Application Priority Data

Sep. 27, 2019 (IN) .............................. 201941039263

(51) Int. Cl.
*G01S 7/48* (2006.01)
*G01S 7/497* (2006.01)
*G01S 17/00* (2020.01)
*G01S 17/931* (2020.01)

(52) U.S. Cl.
CPC ............ *G01S 7/4808* (2013.01); *G01S 7/497* (2013.01); *G01S 17/006* (2013.01); *G01S 17/931* (2020.01)

(58) Field of Classification Search
CPC .. G01S 17/0006; G01S 17/931; G01S 7/4808; G01S 7/497

USPC ........................................................ 702/158
See application file for complete search history.

(56) References Cited

U.S. PATENT DOCUMENTS

| 9,315,192 | B1* | 4/2016 | Zhu | G06K 9/6217 |
| 9,367,065 | B2 | 6/2016 | Dolgov et al. | |
| 9,383,753 | B1* | 7/2016 | Templeton | G01S 17/42 |
| 9,940,761 | B2 | 4/2018 | Kundu et al. | |

* cited by examiner

*Primary Examiner* — John H Le
(74) *Attorney, Agent, or Firm* — Finnegan, Henderson, Farabow, Garrett & Dunner, LLP

(57) ABSTRACT

Disclosed herein is method and system for determining correctness of Lidar sensor data used for localizing autonomous vehicle. The system identifies one or more Region of Interests (ROIs) in Field of View (FOV) of Lidar sensors of autonomous vehicle along a navigation path. Each ROI includes one or more objects. Further, for each ROI, system obtains Lidar sensor data comprising one or more reflection points corresponding to the one or more objects. The system forms one or more clusters in each ROI. The system identifies a distance value between, one or more clusters projected on 2D map of environment and corresponding navigation map obstacle points, for each ROI. The system compares distance value between one or more clusters and obstacle points based on which correctness of Lidar sensor data is determined. In this manner, present disclosure provides a mechanism to detect correctness of Lidar sensor data for navigation in real-time.

13 Claims, 7 Drawing Sheets

METHOD AND SYSTEM FOR DETERMINING CORRECTNESS OF LIDAR SENSOR DATA USED FOR LOCALIZING AUTONOMOUS VEHICLE

TECHNICAL FIELD

The present subject matter is generally related to autonomous vehicles and more particularly, but not exclusively, to a method and a system for determining correctness of Lidar sensor data used for localizing autonomous vehicle.

BACKGROUND

Autonomous vehicles may be equipped with various types of sensors such as, Lidar, sonar, radar, cameras, and other sensors to detect objects in its environment. The autonomous vehicles using Lidar as the main sensing device, requires correct Lidar data points all the time, for localizing the vehicle itself on navigation map. This is a continuous process, but while moving, the autonomous vehicles may face many uncertainties on its vision. The uncertainties may be due to a snowfall which blocks the Lidar vision partially and cause an error in received Lidar data points. Similarly, heavy drops on Lidar screen may cause lens effect or falling tree leaf just wrapped the lidar face for few seconds, may lead to an error in the collected Lidar data points. Further, performance of the Lidar sensor suffers when the weather condition becomes adverse and visibility range decreases.

The existing mechanisms provide a comprehensive model for detecting objects in vehicle's environment. The mechanisms adjust one or more characteristics of the model based on the received weather information to account for an impact of the actual or expected weather conditions on one or more of the plurality of sensors. However, the existing mechanism does not disclose correction of the Lidar point data in real-time which has occurred due to natural things, or incurred any damage, or alignment issue, which hinders Lidar vision.

The information disclosed in the background of the disclosure section is only for enhancement of understanding of the general background of the invention and should not be taken as an acknowledgement or any form of suggestion that this information forms the prior art already known to a person skilled in the art.

SUMMARY

Disclosed herein is a method of determining correctness of Lidar sensor data used for localizing an autonomous vehicle. The method comprises identifying, by a detection system, one or more Region of Interests (ROIs) in Field of View (FOV) of Lidar sensors of the autonomous vehicle along a navigation path. Thereafter, the method comprises obtaining Lidar sensor data comprising one or more reflection points in each of the one or more ROIs. The one or more reflection points correspond to one or more objects in each of the one or more ROIs. Then the method comprises forming one or more clusters of one or more reflection points in each of the one or more ROIs. Once the one or more clusters are formed, the method comprises identifying a distance value between the one or more clusters projected on a 2D map of an environment and corresponding navigation map obstacle points for each of the one or more ROIs. Finally, the method comprises determining correctness of the Lidar sensor data based on the distance value.

Further, the present disclosure discloses a system for determining correctness of Lidar sensor data used for localizing an autonomous vehicle. The system comprises a processor and a memory communicatively coupled to the processor. The memory stores processor-executable instructions, which, on execution, causes the processor to identify one or more Region of Interests (ROIs) in Field of View (FOV) of Lidar sensors of the autonomous vehicle along a navigation path. Thereafter, the processor obtains Lidar sensor data comprising one or more reflection points, in each of the one or more ROIs, wherein the one or more reflection points correspond to one or more objects in each of the one or more ROIs. The processor forms one or more clusters of one or more reflection points in each of the one or more ROIs upon receiving the Lidar sensor data. Thereafter, the processor identifies a distance value between the one or more clusters projected on a 2D map of an environment and corresponding navigation map obstacle points, for each of the one or more ROIs, to determine the correctness of the Lidar sensor data.

Furthermore, the present disclosure comprises a non-transitory computer readable medium including instructions stored thereon that when processed by at least one processor causes detection system for determining correctness of Lidar sensor data used for localizing an autonomous vehicle to identify one or more Region of Interests (ROIs) in Field of View (FOV) of Lidar sensors of an autonomous vehicle along a navigation path. Further, the instructions cause the processor to obtain Lidar sensor data comprising one or more reflection points, in each of the one or more ROIs, wherein the one or more reflection points correspond to one or more objects in each of the one or more ROIs. Furthermore, the instructions cause the processor to form one or more clusters of one or more reflection points in each of the one or more ROIs. In addition, the instructions cause the processor to identify a distance value between the one or more clusters projected on a 2D map of an environment and corresponding navigation map obstacle points, for each of the one or more ROIs. Finally, the instructions cause the processor to determine correctness of the Lidar sensor data based on the distance value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
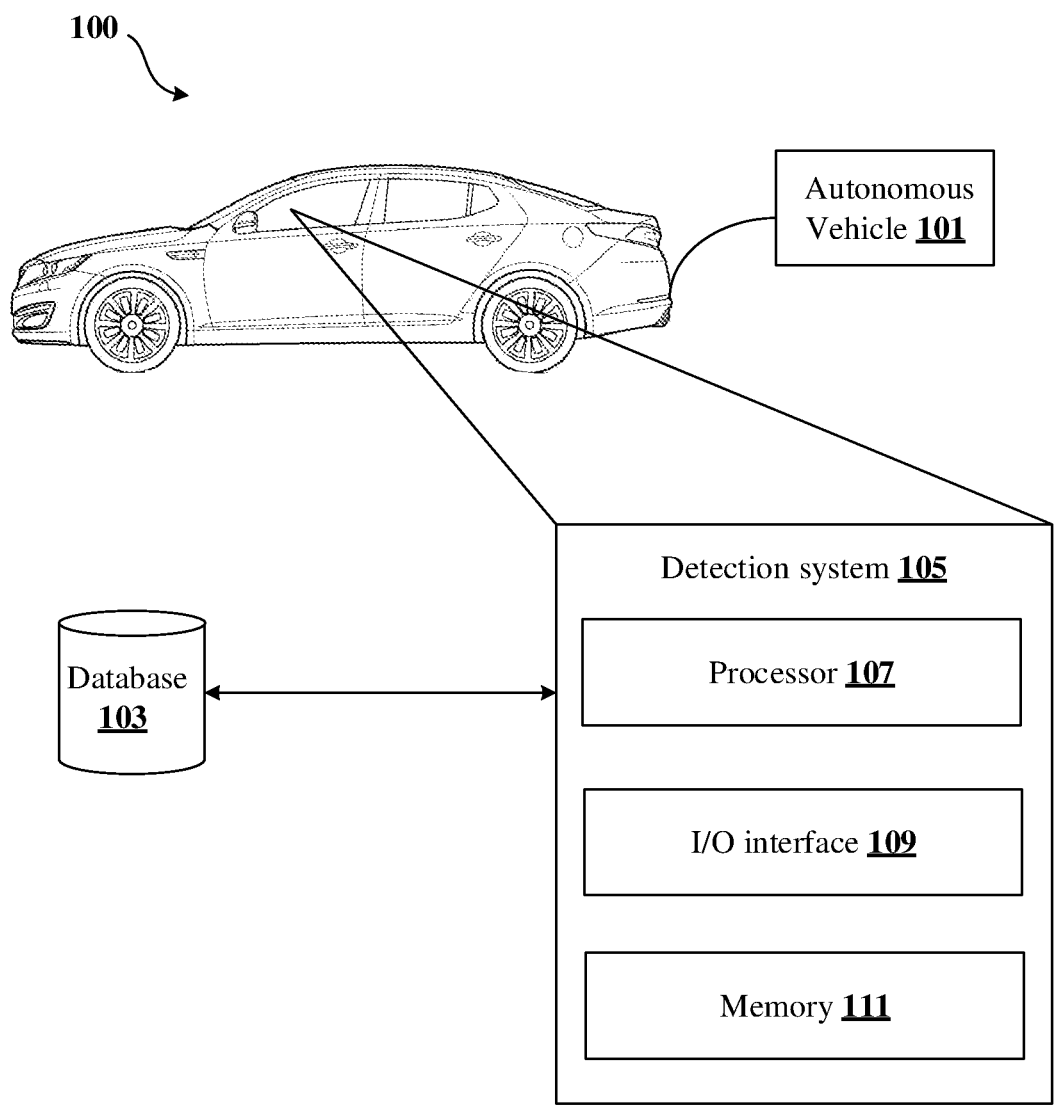
FIG. 1 shows an exemplary architecture for determining correctness of Lidar sensor data used for localizing an autonomous vehicle in accordance with some embodiments of the present disclosure.

It should be appreciated by those skilled in the art that any block diagram herein represent conceptual views of illustrative systems embodying the principles of the present subject matter. Similarly, it will be appreciated that any flow chart, flow diagram, state transition diagram, pseudo code, and the like represent various processes, which may be substantially represented in computer readable medium and executed by a computer or a processor, whether such computer or processor is explicitly shown.

DETAILED DESCRIPTION

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternatives falling within the scope of the disclosure.

The terms "comprises", "comprising", "includes", "including" or any other variations thereof, are intended to cover a non-exclusive inclusion, such that a setup, device, or method that comprises a list of components or steps, does not include only those components or steps, but may include other components or steps, not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to method and system for determining correctness of Lidar sensor data used for localizing an autonomous vehicle. The system may identify one or more Region of Interests (ROIs) in Field of View (FOV) of Lidar sensors of the autonomous vehicle along a navigation path. Each ROI may include one or more objects. As an example, the one or more objects may include, but not limited to, buildings and vehicles. Further, for each ROI, the system may obtain Lidar sensor data from the Lidar sensor. The Lidar sensor data comprises one or more reflection points corresponding to the one or more objects. The system may form one or more clusters in each ROI wherein the clusters comprises one or more reflection points. The system may form the one or more clusters by joining the one or more reflection points until a pattern is formed which is of a predefined length. The pattern may be such as a straight line, arc, L-shape or multiple bend shape. In an embodiment, once the one or more clusters are formed, the system may identify a distance value between the one or more clusters projected on a 2D map of an environment and corresponding navigation map obstacle points, for each of the one or more ROIs. The navigation map obstacle points may be obtained from a navigation map associated with the autonomous vehicle when the vehicle is moving from a current position to a destination position. The system compares distance value between the one or more clusters and the obstacle points on the navigation map. If the distance value is less than a predefined threshold value, the system may detect the Lidar sensor data as correct. However, if the distance value is more than the predefined threshold value, the system may detect the Lidar sensor data as incorrect and provide information to a navigation module of the autonomous vehicle to discontinue navigation. In this manner, the present disclosure provides a mechanism to detect correctness of Lidar sensor data for navigation in real-time.

FIG. 1 shows an exemplary architecture 100 for determining correctness of Lidar sensor data used for localizing an autonomous vehicle 101 in accordance with some embodiments of the present disclosure.

The architecture 100 may include an autonomous vehicle 101 [also referred as vehicle 101], a detection system 105 and a database 103. The database 103 may be configured to store a navigation map. In some embodiments, the detection system 105 may be configured within the autonomous vehicle 101 as shown in the FIG. 1. In some other embodiments, the detection system 105 may be remotely associated with the vehicle 101, via a wireless communication network (not shown). As an example, the vehicle 101 may be a bike, a car, a truck, a bus and the like. The vehicle 101 may be configured with Lidar sensors to aid in navigating the vehicle 101 from a source position to a destination position.

The detection system 105 may include a processor 107, an Input/Output (I/O) interface 109 and a memory 111. The I/O interface 109 may be configured to receive navigation map data from the database 103. The processor 107 may be configured to identify one or more Region of Interests (ROIs) in a Field of View of the Lidar sensors along a navigation path of the vehicle 101. Each ROI may include one or more objects such as building, vehicles and any other man-made objects. Upon identifying the one or more ROIs, the processor 107 may obtain Lidar sensor data from the Lidar sensors. The Lidar sensor data may comprise reflection points of the objects in the ROI. In an embodiment, the processor 107 may form one or more clusters of one or more reflection points lying on the same horizontal plane in each ROI. The one or more clusters may be formed by joining the one or more reflection points until a pattern of a predefined length is formed. As an example, the pattern may include, but not limited to, straight line, arc, L-shape, or multiple bend shape. In one embodiment, the predefined length may be one meter. The one or more clusters may be projected on a 2D environment map associated with the autonomous vehicle 101.

In an embodiment, once the one or more clusters are formed, the processor 107 may identify distance value between the one or more clusters projected on the 2D map and corresponding navigation map obstacle points. The navigation map obstacle points may be obtained from the database 103. The navigation map obstacle points correspond to the same ROI for which the processor 107 has formed the one or more clusters. In an embodiment, the processor 107 may identify a distance value between the one or more clusters projected on the 2D map with the corresponding navigation map obstacle points. In an embodiment, if the distance value is less than a predefined threshold value, the processor 107 may detect the Lidar sensor data as correct. Otherwise, the processor 107 may detect the Lidar sensor data as incorrect. In another embodiment, if the distance values of 75% of the total clusters are less than a predefined threshold value, the processor 107 may detect the Lidar sensor data as correct. Otherwise, the processor 107 may detect the Lidar sensor data as incorrect. Once the Lidar sensor data is detected as incorrect, the processor 107 may provide information regarding incorrect Lidar sensor data to a navigation module of the autonomous vehicle 101 to discontinue the navigation or to look for a safe parking on roadside of the vehicle 101.

Figure 2A:
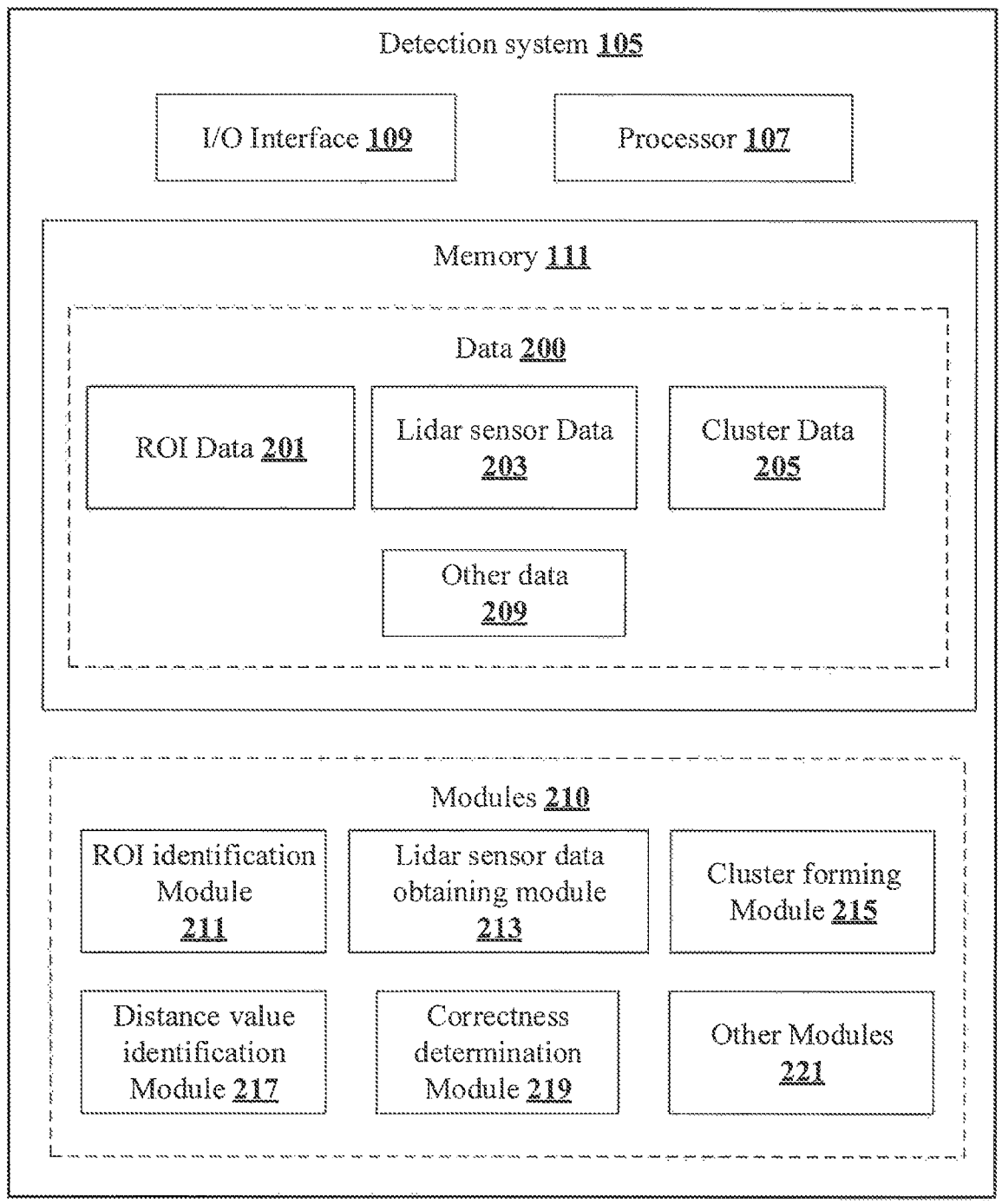
FIG. 2a shows a block diagram of a detection system in accordance with some embodiments of the present disclosure.

FIG. 2a shows a block diagram of a detection system in accordance with some embodiments of the present disclosure.

In some implementations, the system may include data 200 and modules 210. As an example, the data 200 is stored in a memory 111 configured in the system as shown in the FIG. 2a. In one embodiment, the data 200 may include ROI data 201, Lidar sensor data 203, cluster data 205 and other data 209. In the illustrated FIG. 2a, modules are described here in detail.

In some embodiments, the data 200 may be stored in the memory 111 in form of various data structures. Additionally, the data 200 can be organized using data models, such as relational or hierarchical data models. The other data 209 may store data, including temporary data and temporary files, generated by the modules for performing the various functions of the system.

In some embodiments, the data 200 stored in the memory 111 may be processed by the modules 210 of the system. The modules 210 may be stored within the memory 111. In an example, the modules 210 communicatively coupled to the processor 107 configured in the system, may also be present outside the memory 111 as shown in FIG. 2a and implemented as hardware. As used herein, the term modules 210 may refer to an Application Specific Integrated Circuit (ASIC), an electronic circuit, a processor (shared, dedicated, or group) and memory 111 that execute one or more software or firmware programs, a combinational logic circuit, and/or other suitable components that provide the described functionality.

In some embodiments, the modules 210 may include, for example, ROI identification module 211, Lidar sensor data obtaining module 213, a cluster forming module 215, a distance value identification module 217, a correctness determination module 219 and other modules 221. The other modules 221 may be used to perform various miscellaneous functionalities of the system. It will be appreciated that such aforementioned modules may be represented as a single module or a combination of different modules.

In an embodiment, the other modules 221 may be used to perform various miscellaneous functionalities of the system. It will be appreciated that such modules may be represented as a single module or a combination of different modules. Furthermore, a person of ordinary skill in the art will appreciate that in an implementation, the one or more modules may be stored in the memory 111, without limiting the scope of the disclosure. The said modules when configured with the functionality defined in the present disclosure will result in a novel hardware.

Figure 2B:
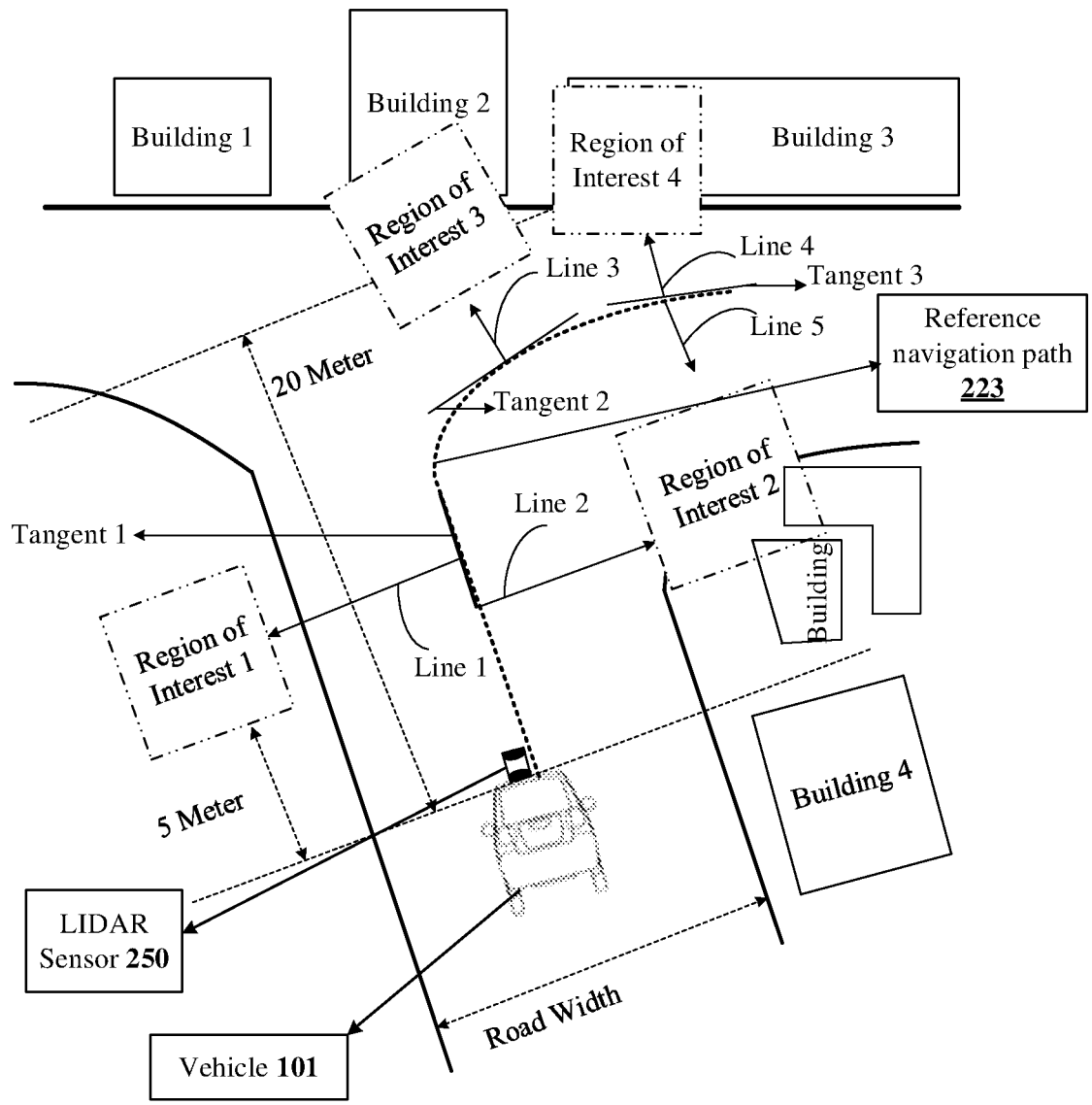
FIGS. 2b-2e illustrates an exemplary method for determining correctness of Lidar sensor data using exemplary Region of Interest (ROIs).

In an embodiment, the ROI identification module 211 may be configured to identify one or more ROIs in Field of View (FOV) of Lidar sensors configured in the vehicle 101. As an example, the autonomous vehicle 101 may be navigating from a source position to a destination position and hence a reference navigation path as shown in FIG. 2b from the source position to the destination position may be obtained from the database 103. The reference navigation path may comprise one or more path points. The ROI identification module 211 may consider the one or more path points for a predefined distance range. As an example, the predefined distance range may be 5-20 meters. So, 20 meters from the current position of the vehicle 101, the one or more path points may be considered for further processing. As shown in FIG. 2b, there may be one or more objects such as building, building 1, building 2, building 3 and so on alongside the vehicle 101 when the vehicle 101 is navigating from the source position to the destination position. However, not all the objects may act as an obstacle for the vehicle 101 and hence it is necessary to identify those objects which are not in field of view of the Lidar Sensor configured in the vehicle 101. Therefore, the ROI identification module 211 may obtain the one or more path points in the predefined distance range which is 20 meters from the source position of the vehicle 101. Once the one or more path points are obtained, the ROI identification module 211 may form one or more straight lines of predefined number of path points. As an example, the predefined number of path points may be five. Therefore, the one or more straight lines are formed along the navigation path from 5 meters distance to 20 meters distance to identify one or more tangents. As shown in FIG. 2b there are 3 tangents, tangent 1, tangent 2 and tangent 3. Once the tangents are identified, the ROI module may identify the one or more ROIs in a direction perpendicular to each of the one or more tangents. As shown in FIG. 2b, the lines, line 1 and line 2 are perpendicular to tangent 1, line 3 is perpendicular to tangent 2 and lines 4 and 5 are perpendicular to the tangent 3. The one or more ROIs such as ROI 1, ROI 2, ROI 3 and ROI 4 are identified based on the direction of the lines from the tangents as shown in FIG. 2b. The identified ROIs may be stored as ROI data 201.

Figure 2C:
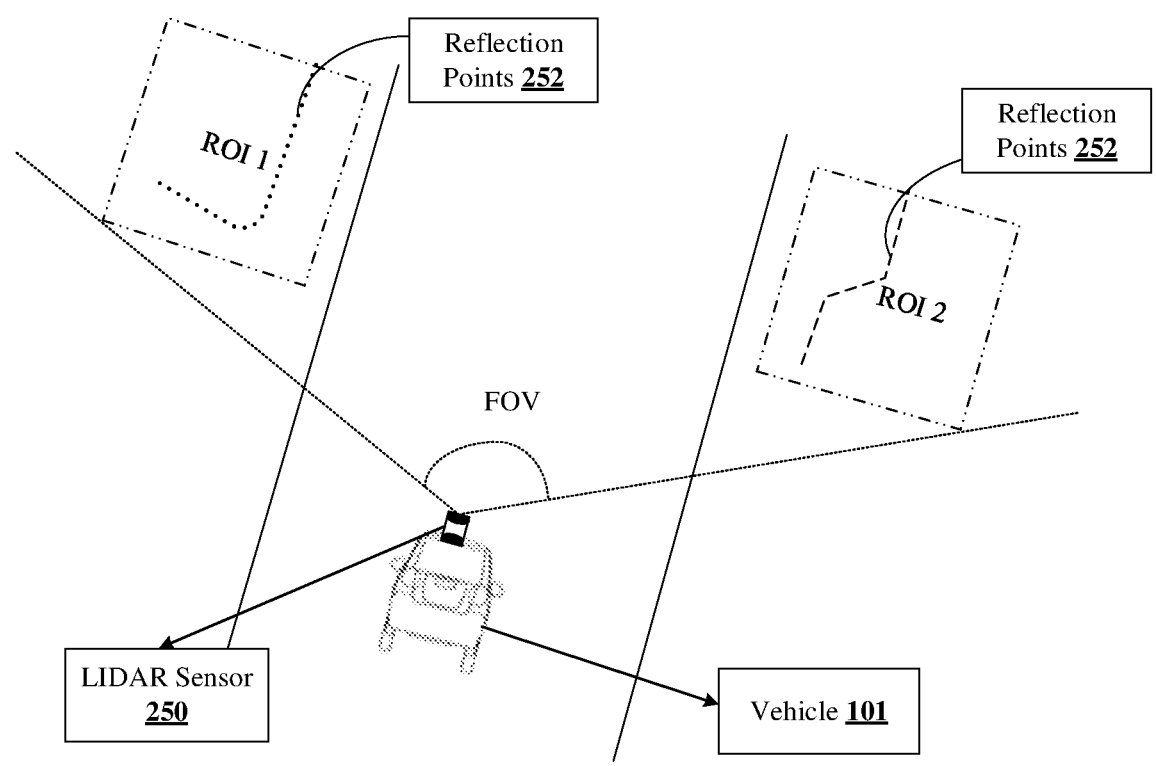

In an embodiment, the Lidar sensor data obtaining module 213 [also referred as obtaining module 213 may be configured to obtain Lidar sensor data 203 associated with one or more objects in each of the identified ROIs. Each ROI may include one or more objects such as buildings and vehicles. The obtaining module 213 may obtain the Lidar sensor data 203 corresponding to the objects in each ROI. The Lidar sensor data 203 may comprise one or more reflection points 252 which corresponds to the objects in the ROI. As an example, two ROIs, ROI 1 and ROI 2 are shown in FIG. 2c. FIG. 2c also shows reflection points 252 of the objects in each ROI, ROI 1 and ROI 2.

Figure 2D:
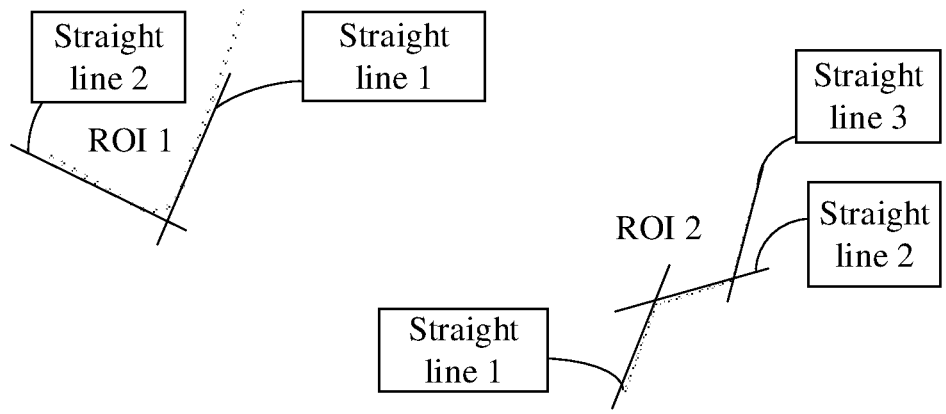

In an embodiment, the cluster forming module 215 may be configured to form one or more clusters of one or more reflection points 252 in each ROI. The one or more clusters may be formed by joining the one or more reflection 252 points until a pattern is formed which is of a predefined length. As an example, the predefined length may be 1 meter and the pattern may be a straight line, arc, L-shape, or multiple bend shape. FIG. 2d shows one or more clusters formed in each ROI. As an example, the ROI 1 may include two clusters of two straight lines, straight line 1 and straight line 2 and the ROI 2 may comprise three clusters of three straight lines, straight line 1, straight line 2 and straight line 3. The formed clusters may be stored as cluster data 205.

Figure 2E:
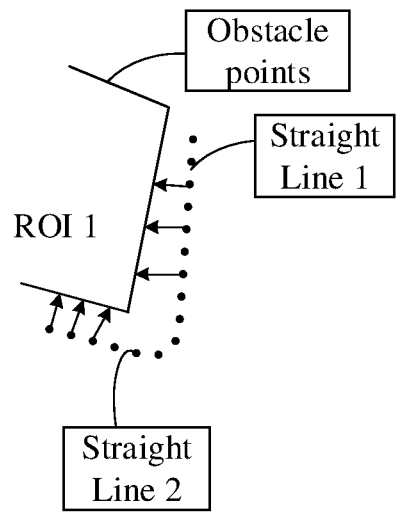

In an embodiment, the distance value identification module 217 may be configured to identify the distance between the one or more clusters and the corresponding obstacle points in navigation map. The obstacle points corresponding to the ROI 1 may be obtained from the navigation map which is as shown in FIG. 2e. FIG. 2e shows the reflection points 252 of two straight lines, straight line 1 and straight line 2. The distance value may be identified using existing distance calculation methods between two points i.e. the reflection points 252 and the obstacle points. In an embodiment, if the distance value is less than the predefined threshold value, the correctness determination module 219 may detect the Lidar sensor data 203 as correct. In another embodiment, if the distance value is less than a predefined threshold value for 80 percent of the identified clusters in each ROI, then the correctness determination module 219 may detect the Lidar sensor data 203 as correct. As an example, the predefined threshold value may be 1.5 meter. If the distance value is greater than the predefined threshold value, then the correctness determination module 219 may detect the Lidar sensor data 203 as correct. Once the Lidar sensor data 203 is detected as incorrect, the processor 107 may provide information regarding incorrect Lidar sensor data 203 to a navigation module of the autonomous vehicle 101 to discontinue the navigation or to look for a safe parking on roadside of the vehicle 101.

Figure 3:
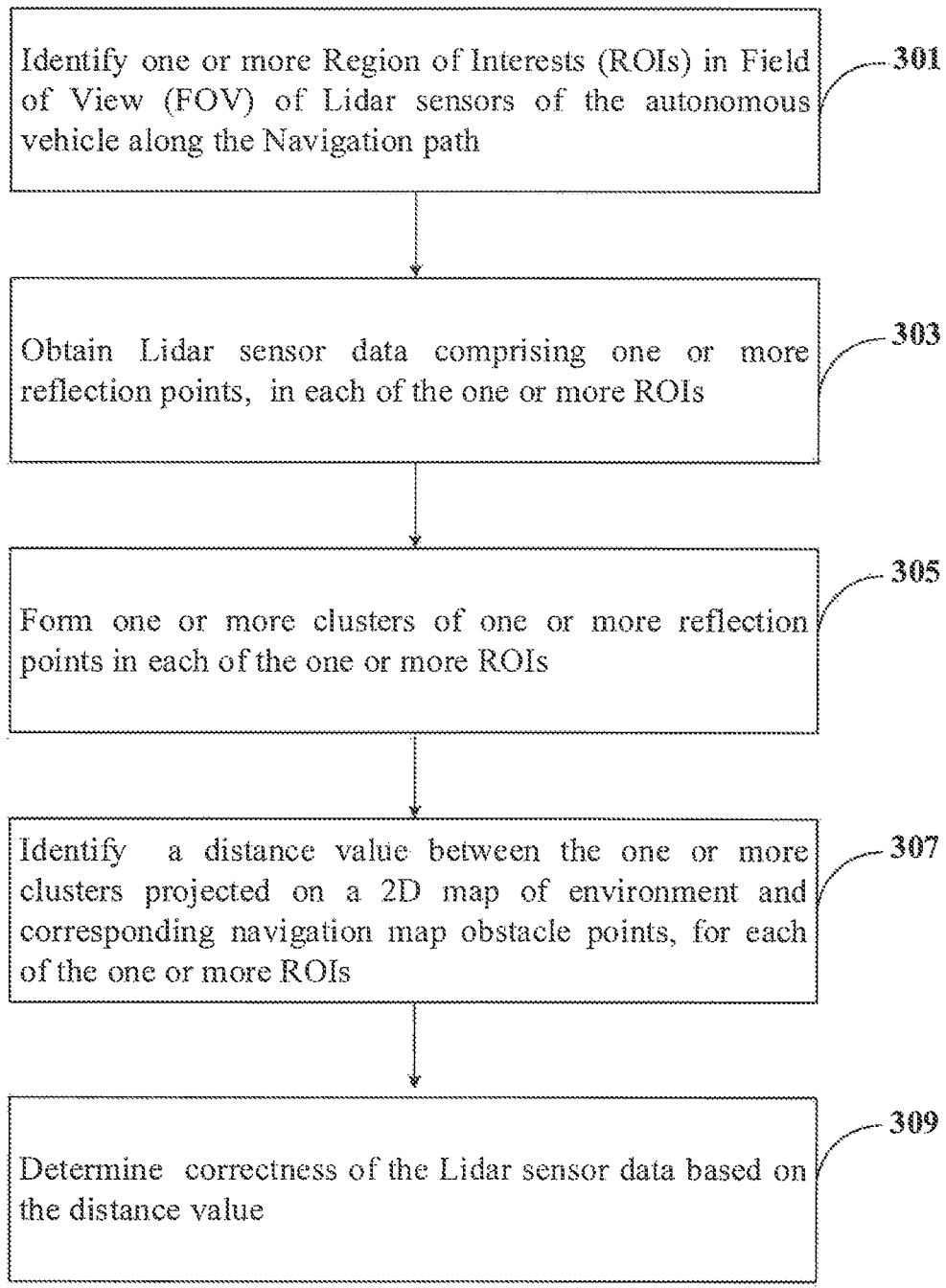
FIG. 3 shows a flowchart illustrating a method of determining correctness of Lidar sensor data used for localizing an autonomous vehicle in accordance with some embodiments of the present disclosure.

FIG. 3 shows a flowchart illustrating method for determining correctness of Lidar sensor data used for localizing an autonomous vehicle 101 in accordance with some embodiments of the present disclosure.

As illustrated in FIG. 3, the figure includes one or more blocks illustrating a method for determining correctness of Lidar sensor data 203 used for localizing an autonomous vehicle 101. The method 300 may be described in the general context of computer executable instructions. Generally, the computer executable instructions can include routines, programs, objects, components, data structures, procedures, modules, and functions, which perform specific functions or implement specific abstract data types.

The order in which the method is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method may include identifying one or more ROIs in FOV of Lidar sensors 250 of the vehicle 101. The one or more ROIs may be identified along the navigation path of the vehicle 101 from a source position to a destination position. The ROIs may include one or more objects such as buildings and vehicles.

At block 303, the method may include obtaining Lidar sensor data 203 in each of the one or more ROIs. The Lidar sensor data 203 may comprise one or more reflection points 252 which corresponds to the objects in the ROI.

At block 305, the method includes forming one or more clusters of one or more reflection points 252 in each of the one or more ROIs. The one or more clusters may be formed by joining the one or more reflection points 252 until a pattern is formed which is of a predefined length. As an example, the predefined length may be 1 meter and the pattern may be a straight line, arc, L-shape, or multiple bend shape.

At block 307, the method may include identifying a distance value between the one or more clusters and navigation map obstacle points for each of the one or more ROIs. The navigation map obstacle points corresponding to each ROI may be obtained from the navigation map. The distance value may be identified using existing distance calculation methods between two points. The distance value such as d1, d2, d3 and so on are determined which are distance between the obstacle points and cluster points in each cluster which may be less than 5 cm. Thereafter, a root mean square value is determined based on the Equation 1 below.

$$d_{rms} = \text{Sqrt}\{((d1)^2 + (d2)^2 + (d3)^2 \ldots (dn)^2)/N\] \quad \text{Equation 1}$$

in an exemplary embodiment, if the $d_{rms}$ value is less than 3 cm for each of the cluster in each ROI then the Lidar sensor data 203 is detected as correct. Otherwise, the Lidar sensor data 203 is detected as incorrect.

At block 309, the method may include determining correctness of Lidar sensor data 203 based on the distance value. If the distance value is less than a predefined threshold value, the processor 107 may detect the Lidar sensor data 203 as correct. If the distance value is greater than the predefined threshold value, the processor 107 may detect the Lidar sensor data 203 as incorrect. Once the Lidar sensor data 203 is detected as incorrect, the processor 107 may provide information regarding incorrect Lidar sensor data 203 to a navigation module of the autonomous vehicle 101 to discontinue the navigation or to look for a safe parking on roadside of the vehicle 101.

Computer System

Figure 4:
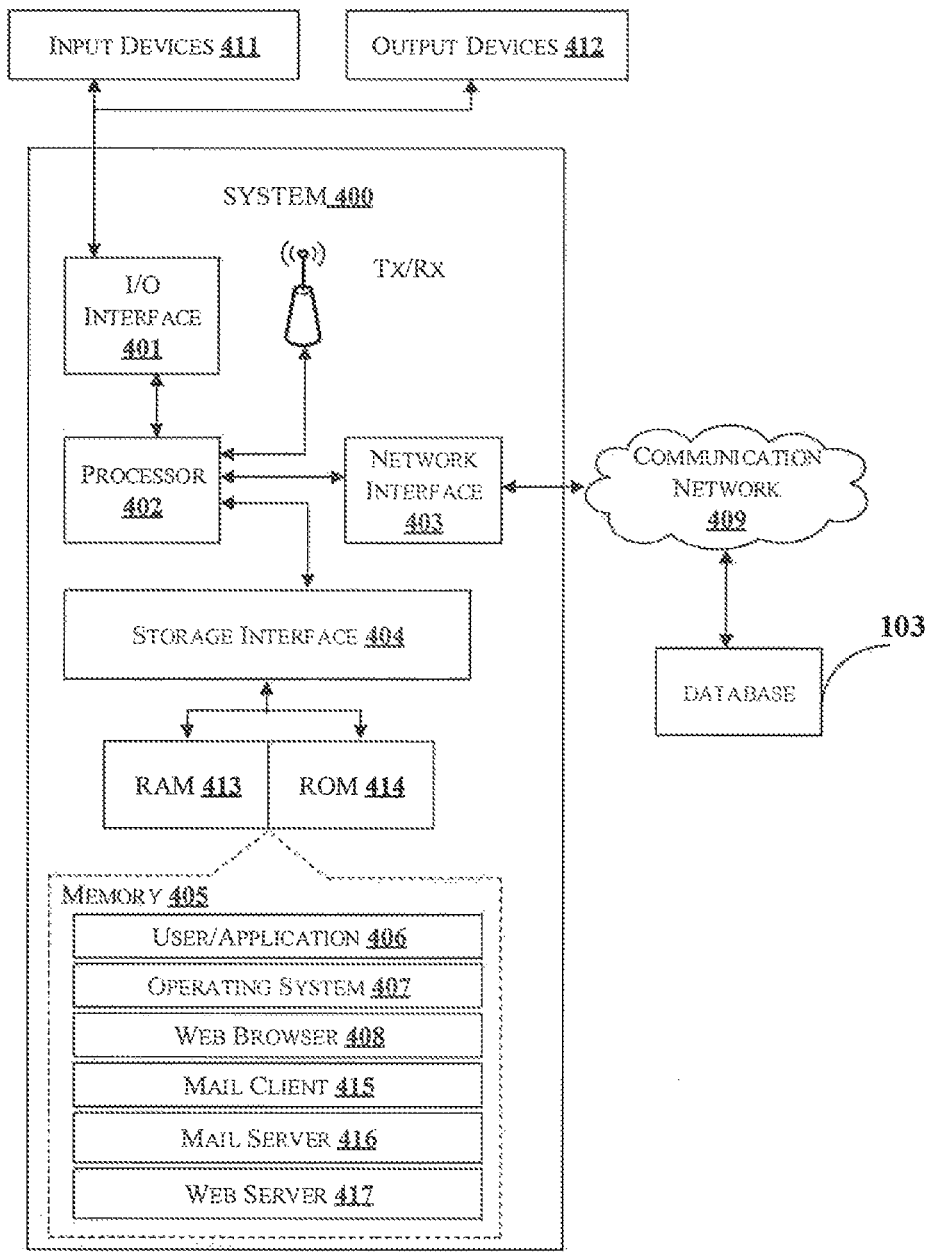
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be a detection system 105 for determining correctness of Lidar sensor data 203 used for localizing autonomous vehicle 101. The computer system 400 may include a central processing unit ("CPU" or "processor") 402. The processor 402 may comprise at least one data processor for executing program components for executing user or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, mail client 415, mail server 416, web server 417 and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems 407 include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix' X-Windows, web interface libraries (e.g., AJAX™, DHTML™, ADOBE FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method and system for determining correctness of lidar sensor data used for localizing autonomous vehicle In an embodiment, since present disclosure implements pattern forming which is compared with 2D data, it involves less computational overhead for determining correctness of Lidar sensor data.

In an embodiment, the present disclosure determines correctness of Lidar sensor data quickly by understanding the environment of the vehicle and hence aids the vehicle to decide whether to continue navigation or stop moving.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Reference Number | Description |
|---|---|
| 100 | Architecture |
| 101 | Autonomous vehicle |
| 103 | Database |
| 105 | Detection system |
| 107 | Processor |
| 109 | I/O interface |
| 111 | Memory |
| 200 | Data |
| 201 | ROI data |
| 203 | Lidar sensor data |
| 205 | Cluster data |
| 209 | Other data |
| 210 | Modules |
| 211 | ROI identification module |
| 213 | Lidar sensor data obtaining module |
| 215 | Cluster forming module |
| 217 | Distance value identification module |
| 219 | Correctness determination module |
| 221 | Other modules |
| 223 | Reference navigation path |
| 250 | LIDAR Sensor |
| 252 | Reflection points |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |
| 415 | Mail Client |
| 416 | Mail Server |
| 417 | Web Server |

What is claimed is:

1. A method of determining correctness of Lidar sensor data used for localizing an autonomous vehicle, the method comprising:
   identifying, by a detection system, one or more Region of Interests (ROIs) in Field of View (FOV) of Lidar sensors of an autonomous vehicle along a navigation path;
   obtaining, by the detection system, Lidar sensor data comprising one or more reflection points, in each of the one or more ROIs, wherein the one or more reflection points correspond to one or more objects in each of the one or more ROIs;
   forming, by the detection system, one or more clusters of one or more reflection points in each of the one or more ROIs;
   identifying, by the detection system, a distance value between the one or more clusters projected on a 2D map of an environment and corresponding navigation map obstacle points, for each of the one or more ROIs; and
   determining, by the detection system, correctness of the Lidar sensor data based on the distance value.

2. The method as claimed in claim 1, wherein the one or more clusters is of a pattern comprising at least one of straight line, arc, L-shape, or multiple bend shape.

3. The method as claimed in claim 2, wherein each of the one or more clusters are formed by joining the one or more reflection points until the pattern is formed which is of a predefined length.

4. The method as claimed in claim 1, wherein the Lidar sensor data is detected as correct when the distance value is less than a predefined threshold value for a predetermined percentage value of each of the identified clusters.

5. The method as claimed in claim 1 further comprising providing information to a navigation module of the autonomous vehicle to discontinue navigation when the Lidar sensor data is incorrect.

6. The method as claimed in claim 1, wherein identifying the one or more ROIs comprises:
   obtaining a reference navigation path from a current autonomous vehicle position to a destination position, wherein the reference navigation path comprises one or more path points;
   obtaining the one or more path points in a predefined distance range in the reference navigation path;
   identifying one or more tangents by forming a straight line of predefined number of path points; and
   identifying the one or more ROIs in a direction of a perpendicular line from each of the one or more tangents.

7. A detection system for determining correctness of Lidar sensor data used for localizing an autonomous vehicle, the detection system comprising:
   a processor; and
   a memory communicatively coupled to the processor, wherein the memory stores processor-executable instructions, which, on execution, causes the processor to:
   identify one or more Region of Interests (ROIs) in Field of View (FOV) of Lidar sensors of an autonomous vehicle along a navigation path;
   obtain Lidar sensor data comprising one or more reflection points, in each of the one or more ROIs, wherein the one or more reflection points correspond to one or more objects in each of the one or more ROIs;
   form one or more clusters of one or more reflection points in each of the one or more ROIs;
   identify a distance value between the one or more clusters projected on a 2D map of an environment and corresponding navigation map obstacle points, for each of the one or more ROIs; and
   determine correctness of the Lidar sensor data based on the distance value.

8. The detection system as claimed in claim 7, wherein the one or more clusters is of a pattern comprising at least one of straight line, arc, L-shape, or multiple bend shape.

9. The detection system as claimed in claim 8, wherein the processor forms each of the one or more clusters by joining the one or more reflection points until the pattern is formed which is of a predefined length.

10. The detection system as claimed in claim 7, wherein the processor detects the Lidar sensor data as correct when the distance value is less than a predefined threshold value for a predetermined percentage value of each of the identified clusters.

11. The detection system as claimed in claim 7, wherein the processor further provides information to a navigation module of the autonomous vehicle to discontinue navigation when the Lidar sensor data is incorrect.

12. The detection system as claimed in claim 7, wherein the processor identifies the one or more ROIs by performing steps of:
   obtaining a reference navigation path from a current autonomous vehicle position to a destination position, wherein the reference navigation path comprises one or more path points;

obtaining the one or more path points in a predefined distance range in the reference navigation path;

identifying one or more tangents by forming a straight line of predefined number of path points; and identifying the one or more ROIs in a direction of a perpendicular line from each of the one or more tangents.

13. A non-transitory computer readable medium including instructions stored thereon that when processed by at least one processor causes detection system to determine correctness of Lidar sensor data used for localizing an autonomous vehicle by performing operations comprising:

identifying one or more Region of Interests (ROIs) in Field of View (FOV) of Lidar sensors of an autonomous vehicle along a navigation path;

obtaining Lidar sensor data comprising one or more reflection points, in each of the one or more ROIs, wherein the one or more reflection points correspond to one or more objects in each of the one or more ROIs;

forming one or more clusters of one or more reflection points in each of the one or more ROIs;

identifying a distance value between the one or more clusters projected on a 2D map of an environment and corresponding navigation map obstacle points, for each of the one or more ROIs; and determining correctness of the Lidar sensor data based on the distance value.

* * * * *